(12) United States Patent
Hencke et al.

(10) Patent No.: US 9,843,562 B1
(45) Date of Patent: *Dec. 12, 2017

(54) PRIVATE ANONYMOUS ELECTRONIC MESSAGING

(71) Applicant: West Corporation, Omaha, NE (US)

(72) Inventors: Benjamin Paul Hencke, Santa Cruz, CA (US); Kerry Patrick Quinn, Santa Cruz, CA (US); Alf Martin Wolter Arnberg, Santa Cruz, CA (US); Howard Allen Wood, Aptos, CA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,808

(22) Filed: Jun. 28, 2016

Related U.S. Application Data

(63) Continuation of application No. 14/493,047, filed on Sep. 22, 2014, now Pat. No. 9,380,031, which is a continuation of application No. 13/542,618, filed on Jul. 5, 2012, now Pat. No. 8,850,595.

(51) Int. Cl.
*H04L 29/06* (2006.01)
*H04L 12/58* (2006.01)
*H04L 29/08* (2006.01)

(52) U.S. Cl.
CPC .......... *H04L 63/0421* (2013.01); *H04L 51/04* (2013.01); *H04L 51/28* (2013.01); *H04L 63/102* (2013.01); *H04L 63/126* (2013.01); *H04L 67/30* (2013.01)

(58) Field of Classification Search
None
See application file for complete search history.

(56) References Cited

U.S. PATENT DOCUMENTS

| 6,442,687 | B1 * | 8/2002 | Savage | H04L 63/0407 709/203 |
| 7,222,362 | B1 * | 5/2007 | Canetti | H04L 9/0869 713/155 |
| 7,234,059 | B1 * | 6/2007 | Beaver | H04L 9/0833 380/283 |
| 7,627,533 | B2 * | 12/2009 | Kokko | G06Q 20/382 705/64 |
| 8,326,651 | B2 * | 12/2012 | McLaren | G06F 19/322 600/300 |

(Continued)

*Primary Examiner* — Benjamin Lanier
(74) *Attorney, Agent, or Firm* — Raffi Gostanian

(57) ABSTRACT

Private anonymous electronic messaging between a message originator and a message recipient within an organization encourages open communication which can provide information to the organization that might otherwise be secreted from the organization, and can allow the message originator to obtain desired help (e.g., counseling). By profiling of the message originator based on current and previous electronic messaging within the system as well as external organizational information (e.g., behavioral or financial information), the system can assess concerns yet act as a gateway to protect the message originator's true identity through escalating levels of concern unless a genuine concern about the health, well-being, and/or safety of the message originator, others, or the organization is indicated, in which case the system can reveal the true identity of the message originator as appropriate.

20 Claims, 3 Drawing Sheets

(56) References Cited

U.S. PATENT DOCUMENTS

| | | | | |
|---|---|---|---|---|
| 8,402,117 | B2* | 3/2013 | Zellner | ............... H04L 63/0281 |
| | | | | 709/219 |
| 8,442,479 | B2* | 5/2013 | Bakker | ................... H04W 4/22 |
| | | | | 370/352 |
| 2003/0012344 | A1* | 1/2003 | Agarwal | ................. H04M 11/04 |
| | | | | 379/37 |
| 2005/0091368 | A1* | 4/2005 | Ozburn | ................... G06Q 10/10 |
| | | | | 709/224 |
| 2006/0036748 | A1* | 2/2006 | Nusbaum | .......... G06F 17/30867 |
| | | | | 709/228 |
| 2009/0089417 | A1* | 4/2009 | Giffin | ................ G06F 17/30867 |
| | | | | 709/224 |
| 2009/0325615 | A1* | 12/2009 | McKay | ................... H04L 63/02 |
| | | | | 455/466 |
| 2010/0305970 | A1* | 12/2010 | McLaren | ............. G06F 19/322 |
| | | | | 705/3 |
| 2010/0306858 | A1* | 12/2010 | McLaren | ............. G06F 19/322 |
| | | | | 726/28 |
| 2011/0302412 | A1* | 12/2011 | Deng | ................. H04L 63/0407 |
| | | | | 713/159 |
| 2012/0150565 | A1* | 6/2012 | Gordon | ................... G06Q 50/24 |
| | | | | 705/3 |

* cited by examiner

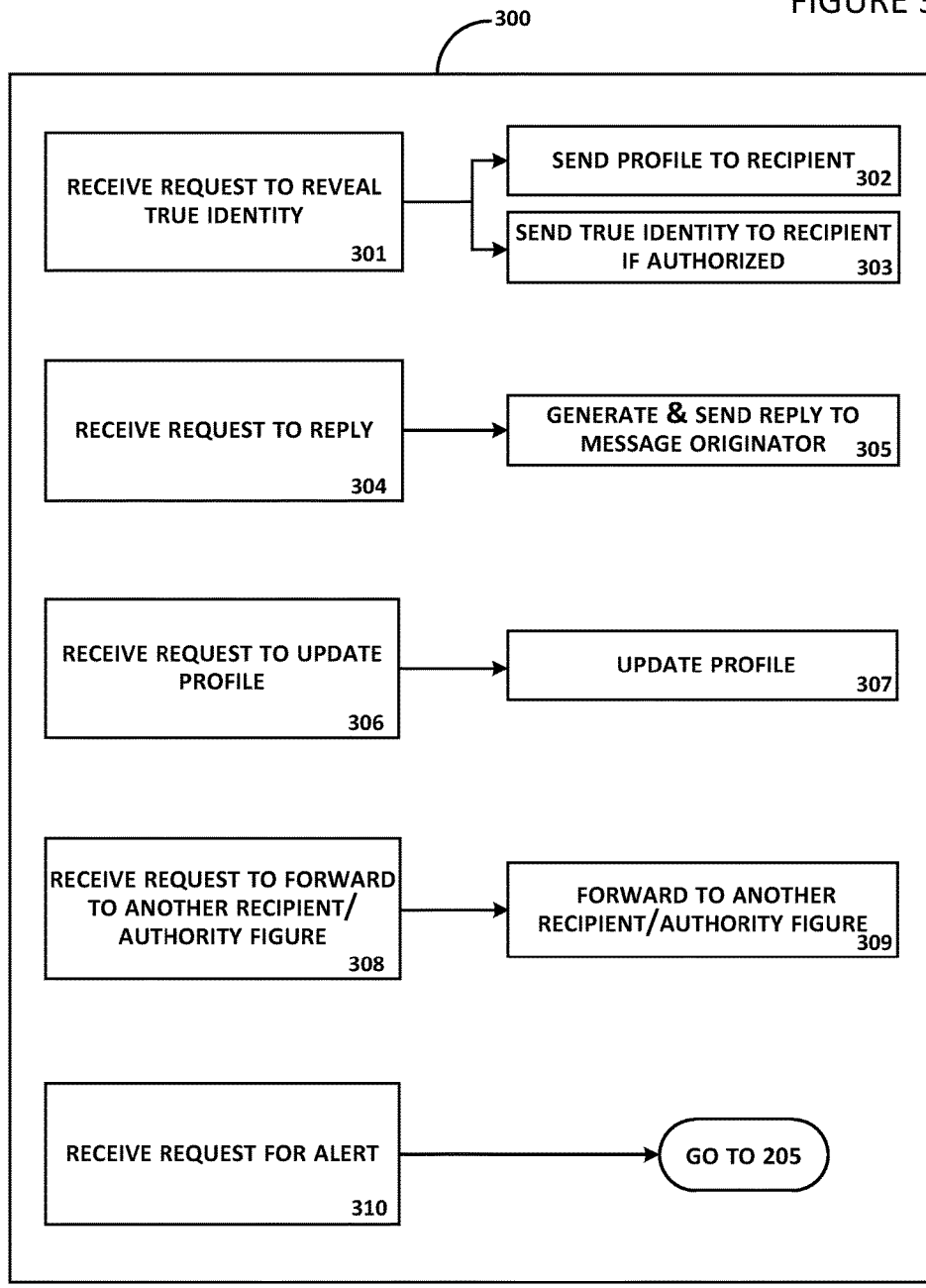

PRIVATE ANONYMOUS ELECTRONIC MESSAGING

CROSS-REFERENCE TO RELATED APPLICATIONS

This application is a continuation from U.S. patent application Ser. No. 14/493,047, filed Sep. 22, 2014, and entitled "PRIVATE ANONYMOUS ELECTRONIC MESSAGING", which is a continuation from U.S. patent application Ser. No. 13/542,618, filed Jul. 5, 2012, and entitled "PRIVATE ANONYMOUS ELECTRONIC MESSAGING", now issued U.S. Pat. No. 8,850,595, each of which is incorporated by reference herein in its entirety.

BACKGROUND OF THE INVENTION

Field of the Invention

The present invention relates generally to electronic messaging systems, and in particular, anonymous electronic messaging systems.

Description of the Prior Art

In today's digital world, communications are often accomplished through electronic means such as email, messaging, webpages, etc., rather than through traditional face-to-face or telephonic exchanges. The ease and convenience of communicating electronically has dramatically changed communications within an organization—be it educational, business, and/or military organizations, or other endeavors.

One drawback of modern electronic communications is that the message originator (i.e., the individual sending the message) within an organization's electronic email or messaging system is identifiable to the message recipient (i.e., the individual receiving the message) through a message header (e.g., from Bob.Smith@bigcorp.com) or through the internet protocol node address from which the message was sent. This transparency can have a negative impact on the message sender (e.g., a student or employee) who may fear repercussions, reprisal, or public disclosure if he uses the traceable electronic communication to bring a concern to the attention of the organization (e.g., by emailing an organizational authority figure such as a school principal or a boss).

Some electronic communication systems do allow a contributor to participate in conversations anonymously—that is, without revealing the message originator. For example, a user of an internet forum system can shield his identity by registering for the forum under an unverified alias (e.g., by using a created user name (e.g., joker@aol.com) that doesn't reveal who the contributor is) or by posting messages anonymously in the forum as a guest. As another example, an email user can shield his identity by using an anonymous remailer which receives an email with embedded instructions on where to forward the email and then forwards the email without revealing the original address from which the email was sent, or substitutes a fake source address for the original source address associated with the email. Alternatively, an email user can use pseudonymous remailer software that assigns each user a pseudonym and maintains a database of instructions detailing how to return emails to the original email address or reply to the email—even though the identity of the message originator using that email address may not be known.

The anonymity offered by both online forum messaging and anonymously/pseudonymously remailed messaging, however, is near absolute—the identity shield cannot be easily pierced regardless of the need. Thus, the identity of the anonymous or pseudonymous user threatening harm to himself, others, and/or an organization remains hidden and/or unverifiable—at least during any reasonable timeframe during which his plans could be intercepted. This inability to verify the identity of a message originator poses a problem for some types of organizations (e.g., educational, business, and/or military organizations) that typically need to be able to rely on verifiable communications with known individuals, and makes anonymous electronic communication systems less desirable.

These same types of organizations (e.g., educational, business, and/or military organizations), however, could benefit from electronic communications systems that offer message originators the assurance of anonymity while giving the organization the ability to deal with real problems. For example, a high school could benefit from a system that allows students to anonymously approach counselors for advice on a concern (e.g., teenage sex or alcoholism) or to anonymously report incidents such as inappropriate teacher behavior without fear of reprisal or public disclosure. When the concern triggering the communication (e.g., child abuse) is serious enough, however, a mechanism to discover the verified identity of the message originator would be desirable so that the child could receive medical treatment, counseling, or other assistance and the allegation could be investigated.

SUMMARY

In one embodiment is provided a method for electronic messaging between a message originator of an organization and a message recipient of the same organization comprising: authenticating by a disinterested third-party computing system the message originator based on a known true identity; generating by the computing system based on communication with a device of the message originator an electronic message about a topic; updating by the computing system a profile of the message originator based on the electronic message; generating by the computing system an alert based on the updated profile or the electronic message; and sending by the computing system the electronic message and the alert to a device of the message recipient without revealing the known true identity of the message originator unless the alert exceeds a predefined threshold that triggers revealing the known true identity of the message originator or if the message recipient is authorized by the organization to receive the known true identity.

In another embodiment is provided a method for electronic messaging between a message originator of an organization and a message recipient of the same organization comprising: authenticating by a disinterested third-party computing system the message originator based on a known true identity; generating by the computing system based on communication with a device of the message originator an electronic message about a topic; updating by the computing system a profile of the message originator based on the electronic message; sending the electronic message to a device of the message recipient without revealing the true identity of the message originator; receiving a request from the device of the message recipient to reveal the true identity of the message originator; and sending by the computing system some or all of the updated profile of the message originator to the device of the message recipient without revealing the true identity of the message originator unless the message recipient is authorized by the organization to receive the known true identity.

In yet another embodiment is provided a non-transitory computer readable medium having stored thereupon computing instructions comprising: a code segment to authenticate by a disinterested third-party computing system a message originator of an organization based on a known true identity; a code segment to generate by the computing system based on communication with a device of the message originator an electronic message about a topic; a code segment to update by the computing system a profile of the message originator based on the electronic message; a code segment to generate by the computing system an alert based on the updated profile or the electronic message; and a code segment to send by the computing system the electronic message and the alert to a device of a message recipient of the same organization without revealing the known true identity of the message originator unless the alert exceeds a predefined threshold that triggers revealing the known true identity of the message originator or if the message recipient is authorized by the organization to receive the known true identity.

In still another embodiment is provided a non-transitory computer readable medium having stored thereupon computing instructions comprising: a code segment to authenticate by a disinterested third-party computing system a message originator of an organization based on a known true identity; a code segment to generate by the computing system based on communication with a device of the message originator an electronic message about a topic; a code segment to update by the computing system a profile of the message originator based on the electronic message; a code segment to send the electronic message to a device of a message recipient of the same organization without revealing the true identity of the message originator; a code segment to receive a request from the device of the message recipient to reveal the true identity of the message originator; and a code segment to send by the computing system some or all of the updated profile of the message originator to the device of the message recipient without revealing the true identity of the message originator unless the message recipient is authorized by the organization to receive the known true identity.

BRIEF DESCRIPTION OF DRAWINGS

FIG. 3 is a block diagram illustrating possible message recipient-triggered actions in the method for private anonymous electronic messaging according to one embodiment.

DETAILED DESCRIPTION OF THE INVENTION

Figure 1:
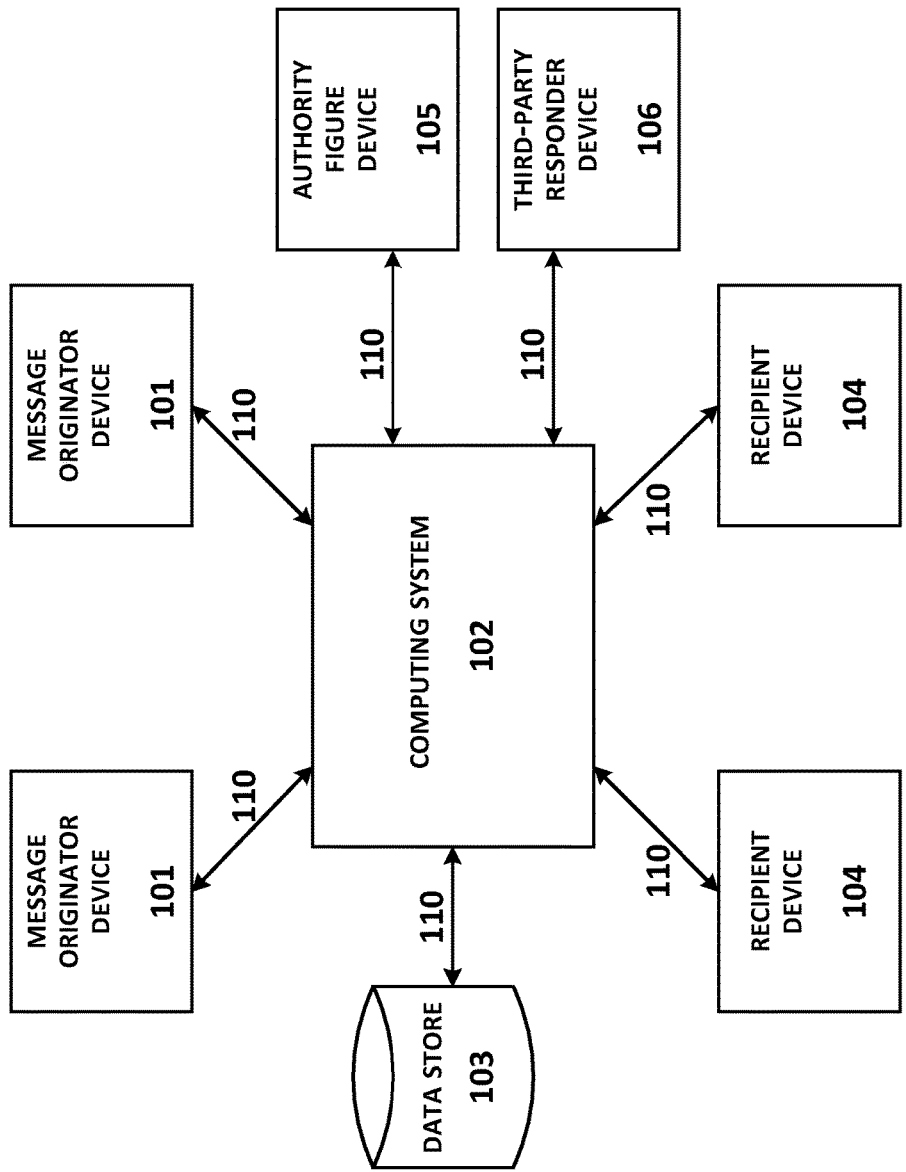
FIG. 1 is a block diagram of a system for private anonymous electronic messaging according to one embodiment.

Described herein are various embodiments of a method and system whereby an individual (e.g., student) within an organization (e.g., school) can initiate and maintain an anonymous electronic dialogue about a concern (e.g., sexual harassment) with a representative of the organization (e.g., a teacher), while at the same time the organization has the ability to identify and deal appropriately with concerns that may arise with respect to the health, well-being, and/or safety of the organization and/or its members. The anonymity of the individual during the electronic dialogue is realized by using a disinterested third-party computing system to manage the electronic communications from and to the individual without revealing the true identity of the individual to the representative with whom the individual is communicating. The true identity is a verified name, identification number (e.g., student identification number, military identification number, or employee identification number), or other similar unique identifier (e.g., social security number, driver's license number, digital identity, fingerprints, etc.) that the organization has correlated to a known actual individual—that is, the true identity is not just an alias, moniker, or self-selected user identification.

Allowing the individual to remain anonymous during the electronic dialogue encourages an open and honest communication (between that individual and the representative of the organization) which can be beneficial to both the individual and the organization. For example, a student can anonymously discuss concerns about being sexually harassed by someone at the school without having to worry about retaliation or public disclosure of the situation and in return receive advice, counseling, and/or information about his legal options from the representative who does not know the identity of the student. At the same time, the school can learn about potentially criminal behavior which might otherwise have gone undetected and institute investigative and/or remedial actions.

The anonymity of the individual is not, however, absolute. Instead, the disinterested third-party computing system acts as a gateway to maintain this confidentiality of the individual's true identity until/unless disclosure of his true identity is necessary to deal with a concern affecting the individual, others, or the organization. The determination of whether a concern necessitates disclosure of the individual's true identity can be based on a profile of the individual created by the disinterested third-party computing system and/or on an assessment by the representative of the organization who received the communication. The disinterested third-party computing system profiles the individual based on objective data extracted from and/or subjective metrics generated from current and historical electronic messages from and to the individual, as well as, in some cases, other organizational data (e.g., student attendance record).

Once a concern is identified, the disinterested third-party computing system can activate an alert. Depending on the severity of the activated alert, the disinterested third-party computing system can respond in a number of ways including, without limitation, (1) sending the activated alert to the representative of the organization and/or to another party (e.g., an organizational authority figure such as a school principal and/or a third-party responder such as the police or fire department); (2) providing the profile of the individual to the representative of the organization and/or to another party (e.g., an organizational authority figure such as a school principal and/or a third-party responder such as the police or fire department); and/or (3) disclosing the true identity of the individual to the representative of the organization and/or to another party (e.g., an organizational authority figure such as a school principal and/or a third-party responder such as the police or fire department).

This private anonymous electronic messaging system differs in some important respects from both online forums and email systems. In the private anonymous electronic messaging system embodied as described herein, despite maintaining anonymity for communications, the true identity of the individual initiating the electronic dialogue is determinable by the system and/or the organization. Thus, the true identity of the message originator can be revealed—almost immediately if necessary (as, for example, if the message originator poses a risk to himself, others, or the organization). As discussed above, neither online forums nor email systems are designed to ensure user anonymity while maintaining the ability to verify the true identity of a user. Furthermore, embodiments of the private anonymous electronic messaging system and method described herein utilize profiling of a message originator to evaluate any potential risk to the message originator, others, or the organization.

Referring now to FIG. 1, an exemplary block diagram of one embodiment of the system for private anonymous electronic messaging is shown. As shown in the figure, a computing system 102 (preferably a computer server) is coupled through a communications network 110 to a message originator device 101 operated by a message originator, a recipient device 104 operated by a message recipient, an authority figure device 105 operated by the organizational authority figure, and a third-party device 106 operated by the third-party responder.

Computing system 102 is preferably a computing system of a disinterested third-party, i.e., not related to (e.g., not a parent or subsidiary company of), affiliated with (e.g., not a business partner), or in the possession or control of the organization. Alternatively, in one embodiment, computing system 102 can be related to, affiliated with, and/or in the possession or control of the organization. For example, computing system 102 can be in the possession or control of a school board for a district in which a high-school is the organization to which the message originator, the message recipient, and the organizational authority figure belong.

Computing system 102 communicates through network 110 with message originator device 101, recipient device 104, authority figure device 105, and third-party device 106 to coordinate private anonymous electronic messaging among individuals and/or entities associated with the organization (e.g., one or more message originator, one or more message recipient, one or more organizational authority figure and one or more third-party responder) as described in greater detail herein.

The message originator is the individual (e.g., student) who uses message originator device 101 to communicate through communications network 110 with computing system 102 to generate and send an electronic message about a concern to the message recipient (i.e., the representative of the organization, e.g., teacher) operating recipient device 104.

The organizational authority figure is an administrator or other authority figure for the organization to which the message originator and message recipient belong. For example, in an educational context, the message originator can be a student, the message recipient can be a teacher, and the organizational authority figure can be the principal of the school. Or, as an example in the military context, the message originator can be an enlisted troop, the message recipient can be an officer, and the organizational authority figure can be a base commander. The third-party responder can be an emergency or non-emergency service provider (e.g., doctor, police, fire department, crisis hotline, or Planned Parenthood).

One of skill in the art will recognize that message originator device 101, recipient device 104, authority figure device 105, and third-party responder device 106 can each be the same or different type of device, and each can be a personal computer, a laptop, or any communications-enabled mobile device with a user interface such as a phone, a smartphone, a personal digital assistant (PDA), a media device (e.g., the iPod or iPod Touch from Apple, Inc.), an electronic tablet (e.g., an iPad from Apple, Inc.), or an electronic reader device (e.g., a Kindle or Kindle DX from Amazon.com, Inc. of Seattle, Wash., or The Reader from SONY Electronics Inc.). One of skill in the art will further understand that message originator device 101, recipient device 104, authority figure device 105, and/or third-party responder device 106 can each, in various embodiments, run a standalone application to communicate across network 110 with computing system 102 in a client-server model. This is typically performed by the device operator operating an application such as a web browser running on the device.

Computing system 102 is also coupled to data store 103 either directly or through network 110. Computing system 102 communicates with data store 103 to store and retrieve data about the message originator, as well as data about messages to, from, and about the message originator, in order to create, update, and access a profile of the message originator. The profile for the message originator is a collection of data associated with the message originator comprising objective data from current and/or past electronic messages from and to the message originator, subjective assessments about the message originator, and/or descriptive, predictive, and/or summary metrics about the message originator as discussed further herein. Computing system 102 can also incorporate external content (e.g., grades or other performance indications, attendance records, financial data, behavioral information from staff and/or security personnel, etc.), preferably obtained from the organization, into the profile for the message originator.

One of skill in the art will recognize that computing networks 110 between computing system 102 and various devices and/or between computing system 102 and data store 103 can be the same or different known forms of network communication. One of ordinary skill in the art will understand that each network connection can be, without limitation, an integrated services digital network (ISDN), a broadband ISDN (B-ISDN), a digital subscriber line (ADSL, ADSL+2), a symmetric digital subscriber line (SDSL), a very high speed DSL (VDSL), cable, cellular telephone, wireless, a broadband internet connection, a T-1 line, a bonded T-1 line, a T-3 line, an optical carrier level 3 (OC3), a satellite, or any other form of network connection now known or later developed. One of ordinary skill in the art will further understand that network 110 can be a combination of wired and/or wireless networks, a wide area network (WAN), a local area network (LAN), a global area network (GAN), a virtual private network (VPN), a personal area network (PAN), an enterprise private network, or any similar network now known or later developed.

In various embodiments, the organization provides to computing system 102 the true identity in the form of names of organization members for the private electronic messaging system. Alternatively, the organization can provide to computing system 102 the true identity in the form of unique identifiers for members of the organization, which unique identifiers (e.g., student/employee numbers) can be correlated by the organization to the respective true identity of its members. In this embodiment, the organization itself can maintain a master list of the true identity of the potential message originator assigned to each unique identifier, so personally identifiable information (e.g., full name, social security number, driver's license number, digital identity, fingerprints, etc.) for the potential message originators remains with the organization rather than being shared with computing system 102. In other embodiments, computing system 102 can maintain the master list of the true identity of the individual assigned to each unique identifier. In one embodiment, a system-generated unique temporary authentication token is provided to the organization member (after s/he has been assigned a unique identifier) to allow him/her to access the system in order to activate an account.

In one embodiment, an organization member can activate an account within the private messaging system by providing his system-generated unique temporary authentication token to enter the system process of selecting a user name and password. In another embodiment, an organization member can activate an account within the private messaging system by providing his name or unique identifier to enter the system process of selecting a user name and password. This process is the same as in other known messaging systems except that either computing system 102 or the organization knows the true identity of the organization member providing the selected user name and password.

Once an account is activated, a student may want to send a message anonymously (thus becoming the message originator) to a teacher (who thus becomes the message recipient) about a concern (i.e., topic). A process flow of the method by which the student can do so via private anonymous electronic messaging according to one embodiment is presented in FIG. 2. In step 201, computing system 102 authenticates the message originator (communicating via message originator device 101 with computing system 102 through network 110), preferably through a user login with the user name and password. This authentication process permits computing system 102 to verify that the user is an account holder whose true identity is known.

In step 202, computing system 102 communicates with the message originator to generate a private anonymous electronic message to be sent to one or more message recipient. The electronic message from a message originator consists of one or more identified message recipient (selected by the message originator or by computing system 102), one or more topic, and the message content. Computing system 102 receives message content for the electronic message from the message originator who enters message content into the system through message originator device 101, typically through textual input through some type of keyboard or spoken message content translated into text.

The message originator can choose one or more predefined message topic (e.g., sexual harassment, depression, threat to personal safety, threat to the organization, etc.) preferably from a drop-down list presented through a user interface.

The message originator can also select one or more message recipient for the generated electronic message and/or computing system 102 can direct the electronic message to one or more organization-designated message recipient based on the message topic and/or profiling (as discussed further herein). The message recipient can be a supervisory-level individual within the organization (e.g., a teacher or counselor), an organizational authority figure (e.g., a principal), or an individual or entity outside the organization (e.g., a third-party counselor such as Planned Parenthood, a crisis hotline, the police, or the fire department), or any similar individual designated by the organization to receive the anonymous electronic communications and identified as such to computing system 102.

As an example, if a student (the message originator) wants to send an electronic message to teacher A (the message recipient) and selects the topic "child abuse", then computing system 102 can send the electronic message with a topic line of "child abuse" to a device of the message recipient (teacher A). Selection of certain topics (e.g., "child abuse") by the message originator can, furthermore, initiate automatic actions by computing system 102. In the child abuse example given above, selection of such a topic can result in computing system 102 also copying the message to a second message recipient (e.g., a counselor designated by the organization to deal with child abuse issues), an organizational authority figure (e.g., school principal) and/or a third-party responder (e.g., police or school board) as appropriate. Such automatic actions initiated by computing system 102 need not be visible to the message originator, but can allow informing appropriate individuals of a situation.

The electronic message about the selected topic from the message originator to the message recipient initiates a topic-specific dialogue. That electronic message and further electronic messages within the same message chain about the selected topic between the message originator and the message recipient (e.g., replies, forwards, etc.) are maintained together as a conversational message thread using known message thread techniques. Thus, the message threads isolate messaging exchanges to and from a given message originator on a specific topic.

Because known messaging techniques create and maintain permanent messages, the electronic messages, once sent, are immutable. As such, the message threads can be useful if the authenticity of the message content is ever questioned (e.g., if the message is introduced as evidence in subsequent legal proceedings).

In various embodiments, the message originator can choose to remain completely anonymous to the message recipient (i.e., no "sender" is indicated on the electronic message), or to be identified within the electronic message by his self-selected user name.

Figure 2:
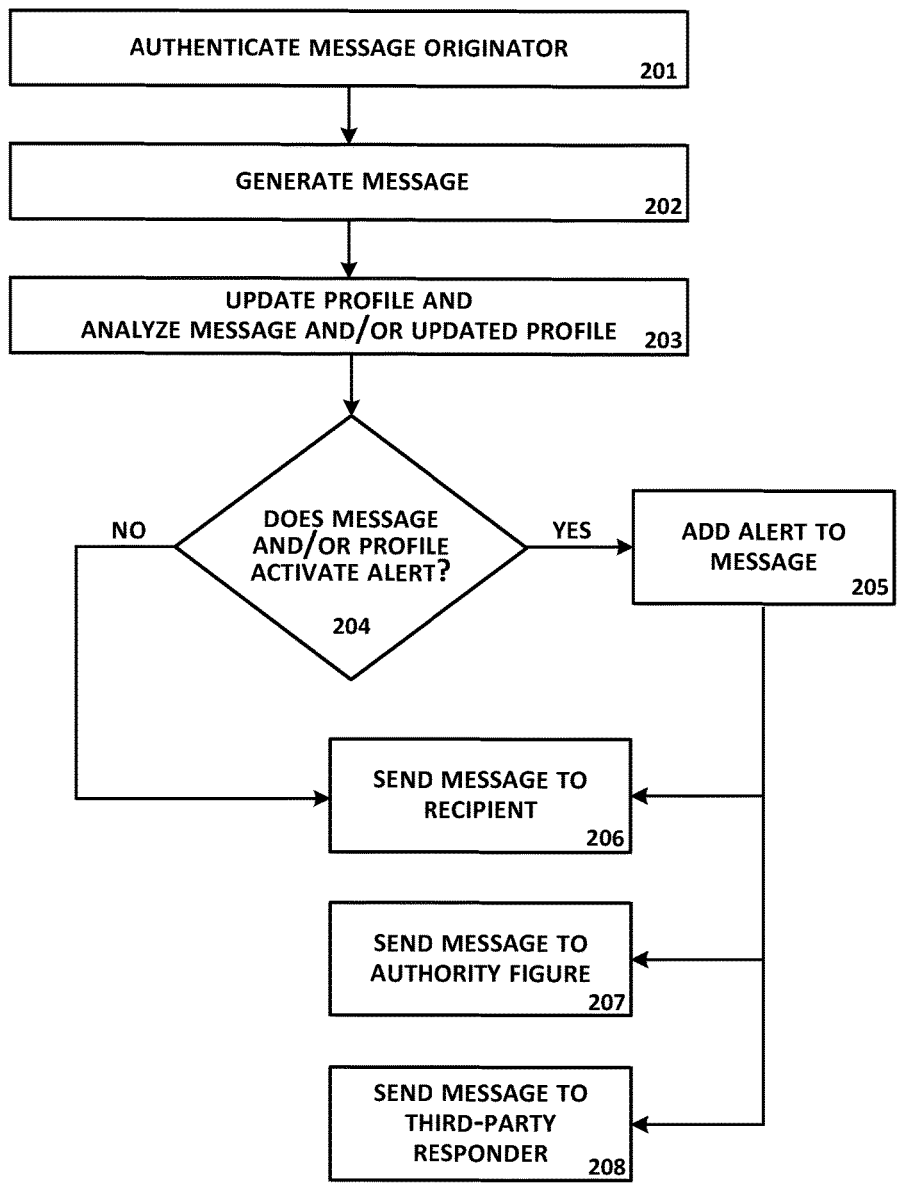
FIG. 2 is an exemplary process flowchart of a method for private anonymous electronic messaging according to one embodiment.

With continuing reference to FIG. 2, once the electronic message has been generated (step 202), then, in step 203, computing system 102 optionally updates the profile and analyzes the generated electronic message and/or updated profile of the message originator. Analysis of the electronic message can involve parsing of information from the electronic message, and can incorporate information retrieved from the updated profile of the message originator. Statistical techniques can also be applied to profile data to generate additional profile metrics. In one embodiment, profile data from multiple message originators can be compiled and analyzed statistically to yield metrics to be applied to the message originator's profile to allow determinations about alert parameters.

Computing system 102 updates the message originator's profile by (i) extracting data from the electronic message generated in step 202 and adding the extracted data to the profile; (ii) generating one or more subjective assessment about the message originator based on the extracted data and adding the subjective assessment(s) to the profile; and/or (iii) applying known statistical algorithms to the extracted data, the subjective assessment(s), and/or the profile of the message originator to generate descriptive, predictive, and/or summary metrics about the message originator and adding the metrics to the profile. Extracted information can include objective information such as, without limitation, electronic message topic(s), time and date of the electronic message, the message recipient(s), thread topic(s), and/or the degree or severity of any perceived concern within the electronic message. Subjective assessments based on the extracted data can include, without limitation, a credibility rating for the message originator, a mood indicator, and/or a risk assessment. These subjective assessments are, in one embodiment, compiled from feedback options provided to message recipients and/or from other data gathered about message originators from the organization. For example, an organizational authority figure could flag a message originator as being a known alarmist. Computing system 102 would apply that metric to the message originator's profile without the organization having knowledge of who that message originator is (e.g., whether the message originator is Billy Smith or Tom Jones). The subjective assessment data can be pre-loaded into computing system 102 with other data about a message originator (e.g., grade level, gender, and/or risk factor).

Statistical metrics can include, without limitation, basic demographic data (e.g., age, gender, pay grade, military ranking, grade point average, and/or other known demographic data), a count of the number of electronic message topics, the number of electronic messages within a given time period, the number of message threads per topic, sub-classifications of topics (e.g., depression can be sub-classified as chronic, seasonal, manic, or postpartum), rankings of the message originator on psychological scales (e.g., personality scales, mood scales) relative to normative standards and/or relative to other message originators, and/or behavioral predictions. The profile can be updated with the extracted data, subjective assessments, and/or statistical metrics in real-time as the data are extracted, assessed, and/or analyzed, or at regular scheduled intervals.

In step 204, computing system 102 determines (based on the analysis of the generated electronic message and/or profile in step 203) whether the message and/or updated profile should activate an alert. An alert indicates a concern about the health and/or safety of the message originator, to the safety/integrity of the organization, and/or to the health, safety, and/or behavior of another individual within the organization. The alert can range along a scale from a low-level cautionary or advisory alert (e.g., the generated electronic message may indicate that the message originator is depressed) to a high-level immediate concern alert (e.g., an immediate threat exists to the message originator, the organization, and/or another individual within the organization). In one embodiment, alert levels are a graduated scale with numbers, colors, or descriptions indicating relative severity. For example, on a 1 to 5 scale, the alerts can be 1—informational alert (e.g., "User John Doe sent a message with a topic of 'depression'");

2—warning alert (e.g., "User John Doe sent a new message with a topic of "depression" and key word analysis of the message indicates a need for expedient follow-up");

3—elevated warning alert (e.g., "User John Doe sent a new message with a topic of "depression" and key word analysis of the message and sender profile analysis indicate elevated cause for concern. See attached report for assessment details."); and 4—high priority alert (e.g., "User John Doe sent a new message with a topic of "depression" and key word analysis of the message and sender profile analysis indicate serious cause for concern. Immediate action is required. See attached report for assessment and additional alert details."); and 5—critical alert (e.g., "User John Doe sent a new message with a topic of "depression" and key word analysis of the message and sender profile analysis indicate imminent threat. Immediate action is required. Local resources have also been contacted. See attached report for assessment and additional alert details as well as detailed crisis management plan.").

In one embodiment, predefined thresholds must be met to activate the alert and/or escalate the alert to a higher level alert. The predefined thresholds are, in one embodiment, a weighted numeric scoring system based on descriptive, predictive, and/or summary metrics. In other embodiments, the predefined threshold is determined in a manner similar to that used in self-assessment tests wherein a series of independent responses are combined to determine an overall assessment (although each contributing response can contribute a larger or smaller amount to the overall assessment depending on its relative importance). For example, a key word analysis of a message which contains the word "suicide" would add more to the aggregate escalation score than 5 messages that each contained the word "sad".

If, in step 204, the message and/or profile indicate that an alert is to be activated, computing system 102 can, in step 205, activate the alert or escalate the level of a previously activated alert, by adding an alert to the generated message (and updating the profile to reflect this alert). A range of alerts can be predetermined by the organization and associated with predefined actions to be performed by computing system 102. Because the alert can range along a scale from a low-level cautionary or advisory alert (which may not require immediate action, e.g., the alert can indicate that the message originator is depressed) to a high-level immediate concern alert (which can necessitate an immediate action, e.g., the alert can indicate a bomb threat), multiple levels of alert escalation are possible.

The alert can include information about why the alert is necessary (e.g., "bomb threat" or "student depressed"). The alert can be conveyed to the message recipient, the organizational authority figure, and/or the third-party as information with the message thread or can even be sent as a new message through the system. In other embodiments, the alert can be distributed by other means such as email, SMS text, system-generated phone calls, and/or an emergency notification system.

Depending on the type or severity of the alert, activation of the alert can trigger automatic actions by computing system 102, including, for example, (i) sending/forwarding the electronic message and the alert to the message recipient, the organizational authority figure, and/or the third-party responder (as discussed further herein with respect to steps 206, 207, and 208); (ii) forwarding the message and/or the alert system-wide to the organization members (as, for example, if a school needs to be evacuated); and/or (iii) revealing the true identity of the message originator (if the system has the true identity of the message originator) or the unique identifier for the message originator (if the system has the unique identifier rather than the true identity of the message originator) to the message recipient, the organizational authority figure, and/or the third-party responder.

In step 206, computing system 102 sends the generated electronic message and the associated alert (separately or together) to the message recipient(s). If the alert is a low-level cautionary alert such that no immediate concern exists (e.g., the profile or message content suggest that the message originator is depressed), computing system 102 can send the electronic message and the associated alert to the message recipient(s) as a warning to review the electronic communication for indications that the message originator may be depressed enough to warrant intervention. In various embodiments, computing system 102 can also send the profile of the message originator (in whole or in part), either with the associated alert and/or the electronic message or as a separate communication.

In step 207, computing system 102 sends the electronic message and the associated alert (separately or together) to one or more organizational authority figure—instead of, or in addition to sending the electronic message and alert to the message recipient(s). For example, if the alert is a mid-level warning alert (e.g., no immediate concern exists, but a potential problem such as a walkout may be developing), computing system 102 can send the electronic message and associated alert to an organizational authority figure such as the manufacturing plant manager—instead of, or in addition to sending the electronic message and associated alert to the message recipient. In other embodiments, computing system 102 can also send the profile of the message originator (in whole or in part) to the organizational authority figure—either with, or separate from, the electronic message and/or the associated alert.

In step 208, computing system 102 sends the electronic message and the associated alert to a third—party responder—instead of, or in addition to sending the electronic message and associated alert (separately or together) to the message recipient(s) and/or the organization authority figure(s). For example, if the alert is a high-level, immediate concern (e.g., "bomb in building 3"), computing system 102 can send the electronic message and associated alert to one or more third-party responder such as the police department, the fire department, and/or the bomb disposal unit—instead of, or in addition to sending the electronic message and associated alert to the message recipient(s) and/or the organizational authority figure(s). Computing system 102 can also send the profile of the message originator (in whole or in part) to the third-party responder—either with, or separate from, the electronic message and/or the associated alert.

Returning to step 204, if the decision is that an alert is not to be activated, then, in step 206, the electronic message is sent to the message recipient without an alert.

After sending the generated electronic message to the message recipient(s), computing system 102 can (but need not) receive one or more type of request from the message recipient. Referring now to FIG. 3, block diagram 300 shows possible message recipient-triggered actions in one embodiment of the method for private anonymous electronic messaging.

In block 301, computing system 102 receives from the message recipient a request to reveal the true identity of the message originator. Such a request might be received if the message recipient were concerned (e.g., triggered by something written in the electronic message) about the message originator, as for example, if the message originator seems seriously depressed and in need of immediate intervention. In response to the request, computing system 102 can send the profile of the message originator (in whole or in part) to the message recipient (block 302) and/or, if the message recipient is preauthorized by the organization to receive true identify information, computing system 102 can send the true identity of the message originator to the message recipient (block 303). If the true identity of the message originator is to be revealed, but computing system 102 has only the unique identifier for that message originator, computing system 102 sends the unique identifier for that message originator to the organizational authority figure authorized to reveal true identities. The organizational authority can, in turn, search the master list of correlated organization member identities and unique identifiers to learn the true identity of the message originator associated with that unique identifier, and provide that information to the message recipient. Alternatively, computing system 102 can send the profile of the message originator (in whole or in part) to the message recipient after receiving a request from the message recipient for the profile of the message originator.

In block 304, computing system 102 receives from the message recipient a request to generate a reply to the received electronic message. Computing system 102 can then communicate with the message recipient to generate and send the reply to the message originator (block 305). In one embodiment, the reply can be attached to the chain of electronic messages within the message thread. Alternatively, the reply can be sent alone. A message thread can be built and maintained between the message originator and the message recipient by looping the steps of FIG. 2 (steps 201 through 206) with generation and sending of the reply (blocks 304 and 305). It is explicitly contemplated that in some circumstances, a message recipient can originate (rather than reply to) an electronic message to the message originator. For example, a teacher or administrator (usually the message recipient) may stop receiving electronic messages from a message originator who was profiled as depressed. Rather than ignore a concern about the safety of that message originator, the message recipient teacher or administrator can (instead of requesting that the true identity of the message originator be revealed) request that computing system 102 generate and send a new message to the message originator to probe his current state. In various embodiments, this "new" message can, or cannot, be associated with the original message thread.

In block 306, computing system 102 receives a request from the message recipient to update the profile of the message originator with an assessment by the message recipient of the message originator or of the message content. Computing system 102 can then update the profile with the assessment (block 307). For example, the message recipient may request that the profile be updated with an assessment that the message originator is depressed, or that the message in the context of the message thread indicates that some behavior of the message originator is escalating.

In block 308, computing system 102 receives a request from the message recipient to forward the electronic message to another message recipient (e.g., a school counselor) or to an organizational authority figure. Computing system 102 can then communicate with the message recipient to forward the electronic message to another message recipient or to the organizational authority figure (block 309).

In block 310, computing system 102 receives a request from the message recipient for activation of an alert. In response, computing system 102 can add the alert to the electronic message as discussed herein (step 205 of FIG. 2) and update the profile of the message originator with the associated alert. Computing system 102 can then perform steps 207, and/or 208 as discussed herein with respect to FIG. 2.

In some embodiments, organization member can optionally provide additional contact information (e.g., a cell phone number or email address) that can be associated with the account so that electronic messages and/or can be transmitted via a short message service (SMS) text message.

One of skill in the art will understand that the private anonymous electronic messaging of the embodiments described herein can also be conducted in the context of email messaging through known email functions such as forwarding messages to additional message recipients, blind carbon copying (bcc'ing) additional message recipients, or organizational authority figures, replying to message originators while carbon copying (cc'ing) additional message recipients, etc.

The disclosed method and apparatus has been explained herein with reference to several embodiments. Other embodiments will be apparent to those skilled in the art in light of this disclosure. Certain aspects of the described method and apparatus may readily be implemented using configurations other than those described in the embodiments herein, or in conjunction with elements other than those described herein. For example, the private anonymous electronic messaging is discussed herein in detail in the context of forum messaging, but can also be implemented in the context of email or text messaging.

Further, it should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic message links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art. For example, although examples herein describe anonymous electronic messaging in an educational environment (e.g., between students and teachers or administrators), other embodiments in other organizational environments (e.g., military, workplace) are expressly contemplated. As an example, in a military environment, an enlisted troop can use the disclosed anonymous electronic messaging methods and systems to, e.g., report hazing by other troops, or abuse sanctioned by an officer. Likewise, in a business environment, a clerical worker can use the disclosed anonymous electronic messaging methods and systems to, e.g., discuss concerns about sexual harassment from a boss.

In the foregoing specification, the invention is described with reference to specific embodiments thereof, but those skilled in the art will recognize that the invention is not limited thereto. Various features and aspects of the herein-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method, comprising:
   authenticating by a disinterested third-party computing system a message originator based on a known true identity;
   generating by the computing system an alert based on an updated profile of the message originator based on an electronic message; and
   sending by the computing system the electronic message and the alert to a device of a message recipient without revealing the known true identity of the message originator unless the alert exceeds a predefined threshold that triggers revealing the known true identity of the message originator or if the message recipient is authorized by the organization to receive the known true identity.

2. The method of claim 1 further comprising sending by the computing system some or all of the updated profile to the device of the message recipient without revealing the known true identity of the message organization unless the alert exceeds a predefined threshold that triggers revealing the known true identity of the message originator or if the message recipient is authorized by the organization to receive the known true identity.

3. The method of claim 2 wherein the electronic message, the alert, and the updated profile are sent in a single communication.

4. The method of claim 2 wherein the electronic message, the alert, and the updated profile are not sent in a single communication.

5. The method of claim 1 wherein the known true identity is the name of the message originator or an organizational identification number unique to the message originator.

6. The method of claim 1, comprising generating by the computing system based on communication with a device of the message originator an electronic message about a topic, wherein the message originator selects the topic from a predefined list of topics.

7. The method of claim 1 further comprising sending by the computing system the electronic message and the alert to a device of an organizational authority figure.

8. The method of claim 1 further comprising sending by the computing system some or all of the updated profile, the known true identity of the message originator, or the updated profile and the known true identity of the message originator to a device of an organizational authority figure.

9. The method of claim 1 further comprising sending by the computing device the electronic message and the alert to a device of a third-party responder.

10. The method of claim 1 further comprising sending by the computing system some or all of the updated profile, the known true identity of the message originator, or the updated profile and the known true identity of the message originator to a device of a third-party responder.

11. A non-transitory computer readable medium having stored thereupon computing instructions comprising:
    a code segment to authenticate by a disinterested third-party computing system a message originator of an organization based on a known true identity;
    a code segment to generate by the computing system an alert based on an updated profile of the message originator based on an electronic message or the electronic message; and
    a code segment to send by the computing system the electronic message and the alert to a device of a message recipient of the same organization without revealing the known true identity of the message originator unless the alert exceeds a predefined threshold that triggers revealing the known true identity of the message originator or if the message recipient is authorized by the organization to receive the known true identity.

12. The non-transitory computer readable medium of claim 1 further comprising computing instructions comprising a code segment to send by the computing system some or all of the updated profile to the device of the message recipient without revealing the known true identity of the message organization unless the alert exceeds a predefined threshold that triggers revealing the known true identity of the message originator or if the message recipient is authorized by the organization to receive the known true identity.

13. The non-transitory computer readable medium of claim 2 wherein the electronic message, the alert, and the updated profile are sent in a single communication.

14. The non-transitory computer readable medium of claim 2 wherein the electronic message, the alert, and the updated profile are not sent in a single communication.

15. The non-transitory computer readable medium of claim 1 wherein the known true identity is the name of the message originator or an organizational identification number unique to the message originator.

16. The non-transitory computer readable medium of claim 1 further comprising computing instructions comprising a code segment to generate by the computing system based on communication with a device of the message originator an electronic message about a topic, wherein the message originator selects the topic from a predefined list of topics.

17. The non-transitory computer readable medium of claim 1 further comprising computing instructions comprising a code segment to send by the computing system the electronic message and the alert to a device of an organizational authority figure.

18. The non-transitory computer readable medium of claim 1 further comprising computing instructions comprising a code segment to send by the computing system some or all of the updated profile, the known true identity of the message originator, or the updated profile and the known true identity of the message originator to a device of an organizational authority figure.

19. The non-transitory computer readable medium of claim 1 further comprising computing instructions comprising a code segment to send by the computing device the electronic message and the alert to a device of a third-party responder.

20. The non-transitory computer readable medium of claim 1 further comprising computing instructions comprising a code segment to send by the computing system some or all of the updated profile, the known true identity of the message originator, or the updated profile and the known true identity of the message originator to a device of a third-party responder.

* * * * *